US009119255B2

(12) United States Patent
Pijlman et al.

(10) Patent No.: US 9,119,255 B2
(45) Date of Patent: Aug. 25, 2015

(54) LIGHT SOURCE COMPRISING A LED STRIP

(75) Inventors: Fetze Pijlman, Eindhoven (NL); Theodorus Johannes Petrus Van Den Biggelaar, Veldhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/233,775

(22) PCT Filed: Jul. 11, 2012

(86) PCT No.: PCT/IB2012/053536

§ 371 (c)(1), (2), (4) Date: Jan. 20, 2014

(87) PCT Pub. No.: WO2013/011422

PCT Pub. Date: Jan. 24, 2013

(65) Prior Publication Data

US 2014/0167632 A1 Jun. 19, 2014

Related U.S. Application Data

(60) Provisional application No. 61/509,622, filed on Jul. 20, 2011.

(51) Int. Cl.
*H05B 39/04* (2006.01)
*H05B 33/08* (2006.01)

(52) U.S. Cl.
CPC ........ *H05B 33/0821* (2013.01); *H05B 33/0806* (2013.01); *H05B 33/0827* (2013.01)

(58) Field of Classification Search
USPC .................... 315/294, 250, 127, 192, 210, 52
See application file for complete search history.

(56) References Cited

U.S. PATENT DOCUMENTS 5,661,374 A 8/1997 Cassidy et al.
7,393,119 B2 * 7/2008 Lebens et al. ................. 362/205
7,712,925 B2 5/2010 Russell
7,740,371 B1 * 6/2010 Lebens et al. ................. 362/205
8,410,720 B2 * 4/2013 Holec et al. ................... 315/294
2005/0180162 A1 8/2005 Fan
2005/0218836 A1 10/2005 Tobler et al.
2006/0086888 A1 4/2006 Eash
2006/0221609 A1 10/2006 Ryan, Jr.
2006/0244622 A1 11/2006 Wray
2007/0080911 A1 4/2007 Liu et al.
2007/0285918 A1 * 12/2007 Sloan et al. ................... 362/231
2007/0297167 A1 * 12/2007 Greenhoe ..................... 362/183
2008/0062691 A1 3/2008 Villard et al.
2008/0211415 A1 * 9/2008 Altamura ...................... 315/192
2009/0167202 A1 * 7/2009 Miskin et al. ................. 315/250
2010/0164409 A1 * 7/2010 Lo et al. ........................ 315/312
2011/0043125 A1 * 2/2011 Peeters ......................... 315/287
2011/0062875 A1 * 3/2011 Altamura ...................... 315/192
2011/0227485 A1 * 9/2011 Huynh .......................... 315/127
2013/0200790 A1 * 8/2013 Stuffle ............................ 315/52

FOREIGN PATENT DOCUMENTS

CN 201555060 U 8/2009
DE 10324609 A1 12/2004

OTHER PUBLICATIONS

"LED Strips Constant-Current Drive and Different Control Modes of the Comparison" www.ledbetop.com/led-news/168.
"Waterproof Flexible LED Strips Can Decorate Your Recumbent" www.ctledlights.com/.
"High-Brightness LED Driver Controller With High-Side Current Sense", Mar. 2010, Micrell, MIC3203/MIC3203-1, pp. 1-21.
"1210 SMD LED Non-Waterproof LED Rigid Strip, LED Rigid Strip", www.ledbetop.com/LED-rigid-strip/61.
"Elemental LED Offers New Resources for Large LED Lilghting Installations", www.prweb.com/releases/LED-lighting/large-installations/prweb8219976.
"Light Tape Electro-Luminx" www.lighttape.com.

* cited by examiner

*Primary Examiner* — Thuy Vinh Tran
*Assistant Examiner* — Syed M Kaiser
(74) *Attorney, Agent, or Firm* — Yuliya Mathis

(57) ABSTRACT

A LED light source comprising a LED strip supplied by a switch mode power supply is disclosed. The LED light source has a low power dissipation and is to a large extent independent of the magnitude of the DC voltage supplying the switch mode power supply. The LED light source allows arbitrary positioning of a light or a presence detector.

11 Claims, 4 Drawing Sheets

1 2 3 4 5 6 7----n
R R R R R R R R
2
LS
D
CC
3
L
S
4

LIGHT SOURCE COMPRISING A LED STRIP

FIELD OF THE INVENTION

The present invention relates to a LED light source comprising at least one LED strip and a corresponding method for generating light making use of a LED strip.

BACKGROUND OF THE INVENTION

LED strips are flexible and can be cut to measure and have many indoor and outdoor applications. FIG. 1 shows a schematical diagram of a typical embodiment of a known LED strip. Two strips of conductive material extend along the length of the LED strip. During operation a DC supply voltage of for instance 12 Volts is present between these strips. Series arrangements, each comprising a resistor R and a LED string LS, are connected in parallel between the conductive strips. The LED string may comprise one or more LEDs, in the embodiment shown in FIG. 1 three LEDs are comprised in a LED string. The conductive strips, the resistors and the LED strings are all mounted on a flexible PCB and covered with a transparent material or a diffusor. A user can cut the LED strip to a desired length at places indicated by a dotted line.

A disadvantage of the known LED strip is that the electronic circuit of each LED string is not efficient, which also leads to heat development. Furthermore, the LED light output is very sensitive for differences in input voltage.

SUMMARY OF THE INVENTION

It is an object of the present invention to provide a light source comprising a strip and a corresponding method for generating light making use of a LED strip, with improved efficiency and a low sensitivity for differences in input voltage, that can also be easily used in combination with presence sensors and/or light sensors. In the present context, the term "LED strip" may on one hand refer to a flexible mounting member for multiple LEDs and eventually further electrical components, where strips of conductive material extend essentially along its length. On the other hand, the term "LED strip" is understood to refer to a common mounting member for multiple LEDs, such as in particular a track or rail electrical supply system, i.e. an "LED track", providing electrical connections and/or power to the LEDs.

According to an aspect of the present invention a LED light source is provided, comprising a first LED strip equipped with input terminals for connection to a DC-supply source, a load comprising a plurality of parallel series arrangements connected between the input terminals, wherein each series arrangement comprises a LED string, and a resistor in series and the common terminals of the resistors and the LED strings are all connected to each other.

According to another aspect of the present invention a corresponding method for generating light making use of a LED strip is provided.

Preferably, a LED light source according to the invention comprises a switch mode power supply for generating a current out of a DC supply voltage, said switch mode power supply comprising output terminals coupled to the input terminals of the first LED strip, a switch, a unidirectional element, an inductive element, a control circuit equipped with an output terminal coupled to the switch for controlling the conductive state of the switch and with an input terminal coupled to the common terminals of the resistors and the LED strings for sensing the current in each of the LED strings. The switch mode power supply is operated as a current source and since the voltage across each resistor is the same, the current through each LED string is substantially equal. Different switch mode power supplies can be used. Good results have been obtained with a switch mode power supply of the type down-converter. The LED light source may comprise at least one further LED strip equipped with input terminals connected to the input terminals of the first LED strip, a further load comprising a plurality of parallel series arrangements connected between the input terminals, wherein each series arrangement comprises a LED string and a resistor in series and the common terminals of the resistors and the LED strings are all connected to each other and to the input terminal of the control circuit. The first LED strip and the further LED strips are thus supplied by the same switch mode power supply. By arranging the first LED strip and the one or more further LED strips in parallel, a light generating surface can be formed.

In a preferred embodiment of a light source according to the invention the first LED strip comprises a series arrangement of a sensor and a resistor coupled in parallel with the series arrangements of a resistor and a LED string comprised in the load and wherein a common terminal of the sensor and the resistor is connected to all the common terminals of the resistors and the LED strings comprised in the load. The series arrangement of the sensor and resistor can be positioned anywhere along the LED strip, allowing a user for instance to position the sensor in an optimal place in a room. The sensor can be a presence sensor or a light sensor.

According to a further preferred embodiment, the resistor of at least one of said series arrangements is a controllable resistor/sensor, connected to an associated lamp control device to control the resistance of said resistor. Preferably, the resistor of each of said series arrangements is controllable and connected to an associated lamp control device.

The present embodiment enables to control the brightness and/or color of the respective series arrangement individually, allowing an enhanced control of the light output of the light source. For example, in case of three series arrangements comprising the colors red, green and blue, it is possible to set the resulting color of the illumination by adjusting the respective "measurement" resistor or sensor.

In the above case of more than one series arrangements having controllable resistors, a single lamp control device may be present to provide control of all resistors. Alternatively, it may be feasible that each series arrangement is associated with a "separate" lamp control device to provide a more scalable solution or that some series arrangements share a lamp control device, resulting in a grouped setup.

The lamp control device may be suitably adapted to control the resistance and thus the current through the respective LED string. The lamp control device may comprise a microprocessor with a suitable programming, a user control interface, a brightness sensor and/or a remote control interface to set the resistance of the resistor and thus the brightness of the LED string.

The controllable resistors may be of any suitable type. Certainly, it may be possible that multiple resistors are connected in series to and/or parallel with each other and only the resistance of one or some resistors is controllable.

According to another preferred embodiment, the LED light source is a track light source comprising at least one electrical supply track. Corresponding track or rail systems are known in the art so that a detailed description is omitted here. The supply track or rail may be adapted for a removable engagement with the series arrangement and/or the switch mode power supply. Preferably, the switch mode power supply is formed integrally with the supply track. Most preferably, the supply track comprises three separate conductors, connected with said switch mode power supply.

Preferably, the series arrangements are comprised in one or more lighting devices, said lighting devices being connectable with said supply track. The lighting devices may e.g. comprise a corresponding electrical connector for engagement with the supply track, allowing a simple (re)configuration of the LED light source. The lighting devices preferably are formed with a housing in which the LED string(s), the associated resistors and any eventual further components, such as the mentioned diffuser and/or lamp control device, are arranged. The lighting devices may thus form “spots”, i.e. spot lights.

BRIEF DESCRIPTION OF THE DRAWINGS

Embodiments of a LED light source according to the invention will be further discussed making reference to the enclosed drawings.

In the drawings.

DETAILED DESCRIPTION OF PREFERRED EMBODIMENTS

Figure 1:
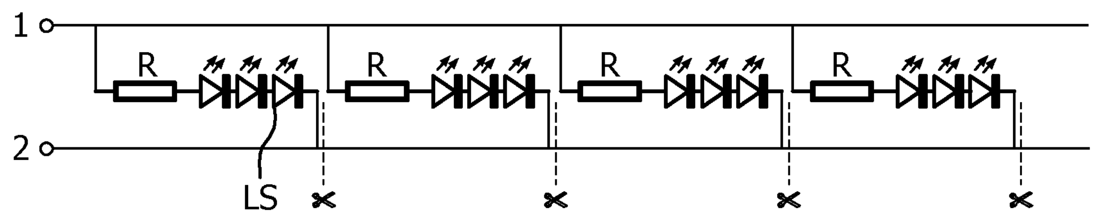
FIG. 1 shows a prior art LED strip.

FIG. 1 has already been discussed here-above and therefore needs no further description.

Figure 2:
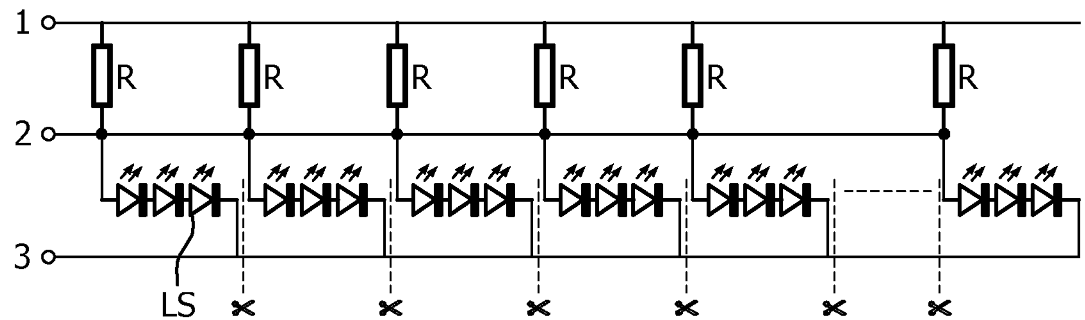
FIGS. 2-7 show embodiments of LED light sources according to the invention.

In FIG. 2 terminals 1 and 3 are input terminals for connection to a DC supply source. Input terminals 1 and 3 are connected to each other by means of a plurality of series arrangements, each series arrangement comprising a resistor R and a LED string LS. The common terminals of the resistors and the LED strings are all connected to each other and to a terminal 2. For the sake of clarity the reference LS is only added to one of the plurality of LED strings in each Figure.

Figure 3:
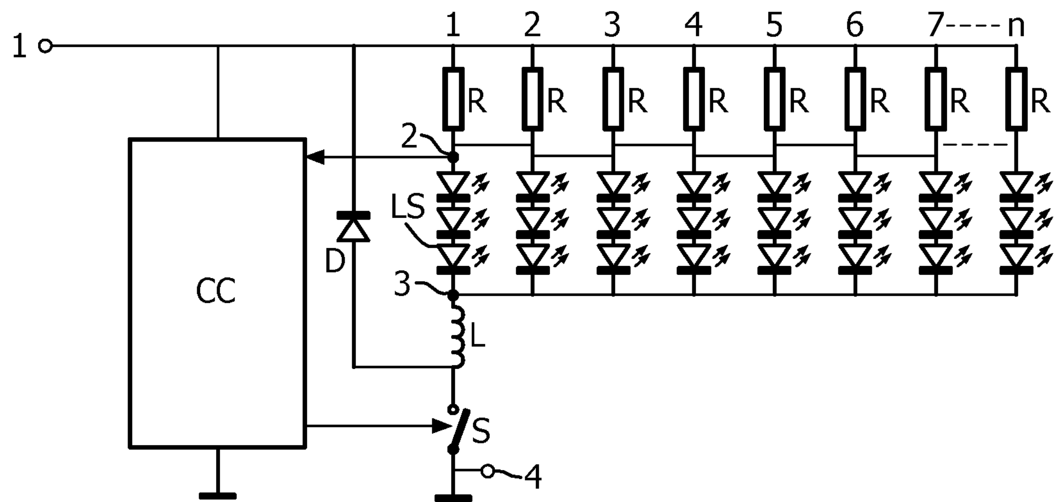

In FIG. 3, switch S, diode D, inductive element L and control circuit CC together form a switch mode power supply. During operation, the switch mode power supply is powered by a DC supply voltage that is present between terminals 1 and 4. Terminal 1 and 3 are output terminals of the switch mode power supply. Terminals 1 and 3 are connected by means of a plurality of parallel series arrangements of resistors R and LED strings LS that together form the electronic part of a (first) LED strip. The LED strip may for instance further comprise a diffusor. Common terminals of resistors R and the LED strings LS are all connected to each other and also to a terminal 2 that is connected to an input terminal of the control circuit CC. A series arrangement of inductive element L and switch S connects terminal 3 with terminal 4. Diode D connects a common terminal of switch S and inductor L with terminal 1. An output terminal of the control circuit CC is connected to a control electrode of the switch S. Control circuit CC is further equipped with two input terminals that are connected to terminal 1 and terminal 4 respectively.

The operation of the LED light source shown in FIG. 3 is as follows.

When a DC supply voltage is present between terminals 1 and 4, and switch S is conductive, a DC current flows from terminal 1 through the plurality of series arrangements of a resistor R and a LED string LS, and through inductive element L and switch S to terminal 4. As long as switch S is conductive, this current increases linearly. Since all the common terminals of the resistors R and LED strings LS are connected to each other, the voltage drop across each resistor R is the same so that also the magnitude of the current through each resistor is substantially the same. As a consequence the currents through the LED string are also substantially identical.

The control circuit CC senses the magnitude of these currents by sensing the voltage drop across the resistors (i.e. the voltage between terminal 1 and terminal 2). When the magnitude of the currents has reached a first reference value, switch S is made non-conductive by the control circuit CC. During the time lapse in which switch S is non-conductive, current flows from the common terminal of inductive element L and switch S through diode D and through the plurality of series arrangements of a resistor R and a LED string LS to terminal 3. During this time lapse the currents through the LED strings are again substantially the same but now the magnitude of the currents decreases linearly. When the magnitude of the currents has reached a second reference value, the switch S is once more rendered conductive by the control circuit CC. The cycle described here-above is then repeated. In practice the first and second reference value are chosen very close together. As a consequence the switch S is rendered alternately conductive and non-conductive at a high frequency and the current through the LED strings is a DC current with a high frequency AC current superimposed on it. Since the amplitude of the high frequency AC current is very small, the total current can be considered as a DC current with a substantially constant amplitude for most purposes. The LED light source shown in FIG. 3 is not very sensitive for changes in the magnitude of the DC-supply voltage and power dissipation in the resistors R is very low so that the LED light source shown in FIG. 3 is very efficient. Another important advantage is that the light output of each LED string is substantially the same and to large extent independent of the amount of LED strings or in other words the length of the LED strip.

In practical embodiments of the LED light sources in FIG. 1 and FIG. 3 LED strings comprising three LEDs with a forward voltage of 3.2 V carrying a current of 0.02 A were used. The power in a LED string is thus 192 mW. The LED light source of 1 was supplied with a 12 V DC supply voltage between terminals 1 and 2, the resistance of a resistor was 120 ohm and the power dissipation in the resistor was thus 48 mW=20%. In the LED light source of FIG. 3, the resistor was 5 ohm and the power dissipated in the resistor was thus only 2 mW.

In FIG. 4 two embodiments of a LED light source according to the invention are shown comprising a sensor. The only difference between the embodiment shown in FIG. 3 and the embodiments shown in FIG. 4, is that in the latter the LED strip comprises a sensor in parallel with the resistors R.

Figure 4A:
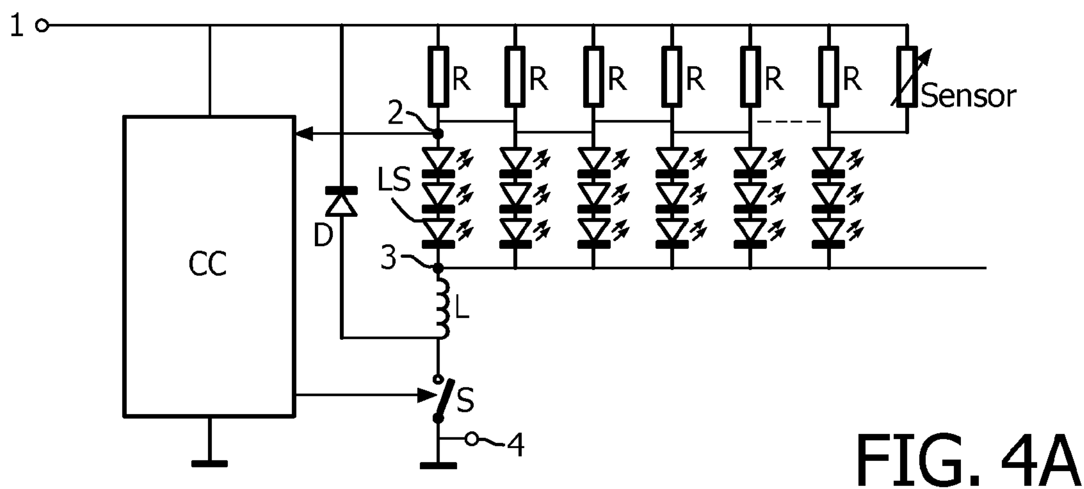
Figure 4B:
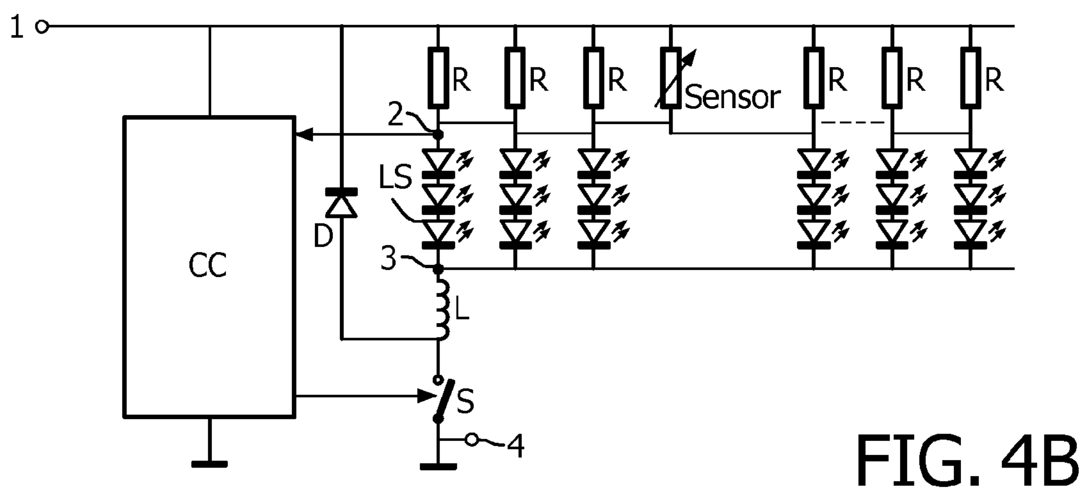

In FIG. 4A the sensor is positioned at the end of the LED strip that is opposite to the end where the switch mode power supply is connected. In FIG. 4B the sensor is positioned at an arbitrary position between the resistors R. FIG. 4 thus illustrates that the sensor can be positioned anywhere along the LED strip.

In case the sensor is a light sensor, it acts as a resistor whose resistance is influenced by the amount of light that strikes it. Since the sensor is in parallel to all the resistors R, it influences the amount of current that flows from terminal 1 to terminal 2 and thus the current through each of the resistors R and thus the current through each of the LED strings LS is influenced by the resistance of the sensor.

In case the sensor is a presence detector, it is a device that has a very low resistance when a presence is detected and a much higher resistance when no presence is detected. As a consequence, the light output of the LED strings is changed from a low light output to a comparatively high light output.

Figure 5:
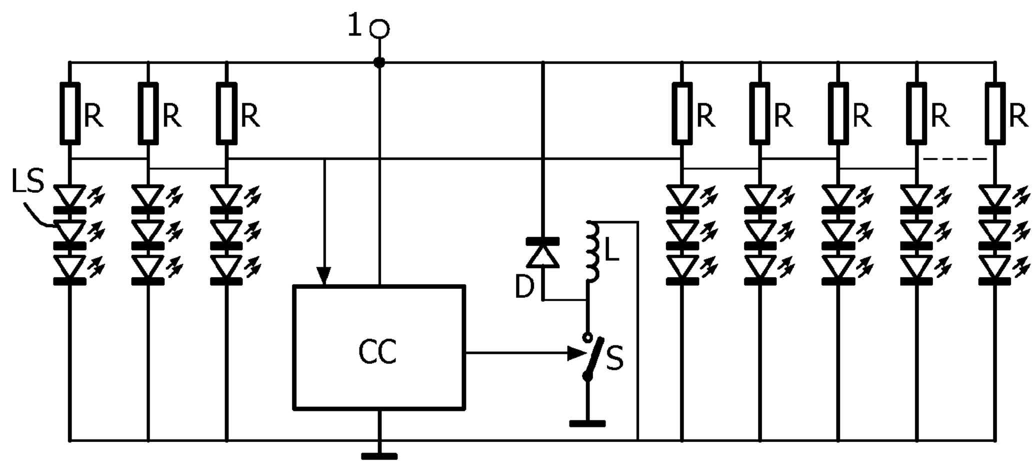

The only difference between the embodiment shown in FIG. 3 and that shown in FIG. 5 is that in the latter the switch mode power supply is positioned at an arbitrary place along the LED strip between the series arrangements of a resistor R and a LED string Ls instead of at one end of the LED strip. FIG. 5 thus illustrates that the switch mode power supply can be positioned everywhere along a LED strip. The operation of the embodiment shown in FIG. 5 is identical to that shown in FIG. 3.

Figure 6:
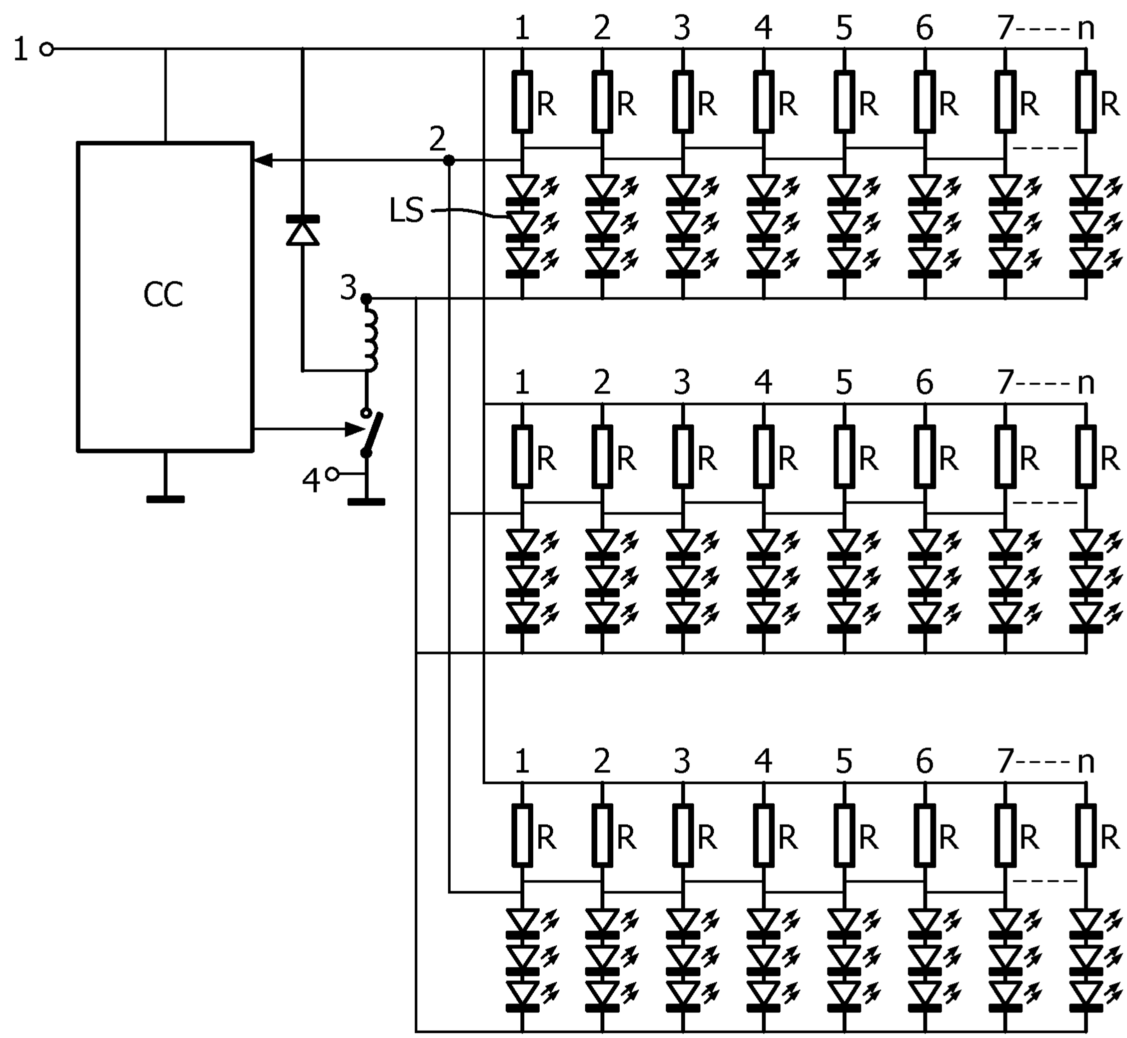

In FIG. 6 an embodiment of a LED light source according to the invention is shown, comprising three parallel LED strips and a single switch mode power supply. Each of the LED strips is connected to the switch mode power supply in the same way as the single LED strip is in the embodiment shown in FIG. 3. FIG. 6 thus illustrates how a light generating surface can be formed out of LED strips in parallel supplied by the same switch mode power supply.

The operation of the LED light source is identical to the operation of the embodiment shown in FIG. 3.

Figure 7:
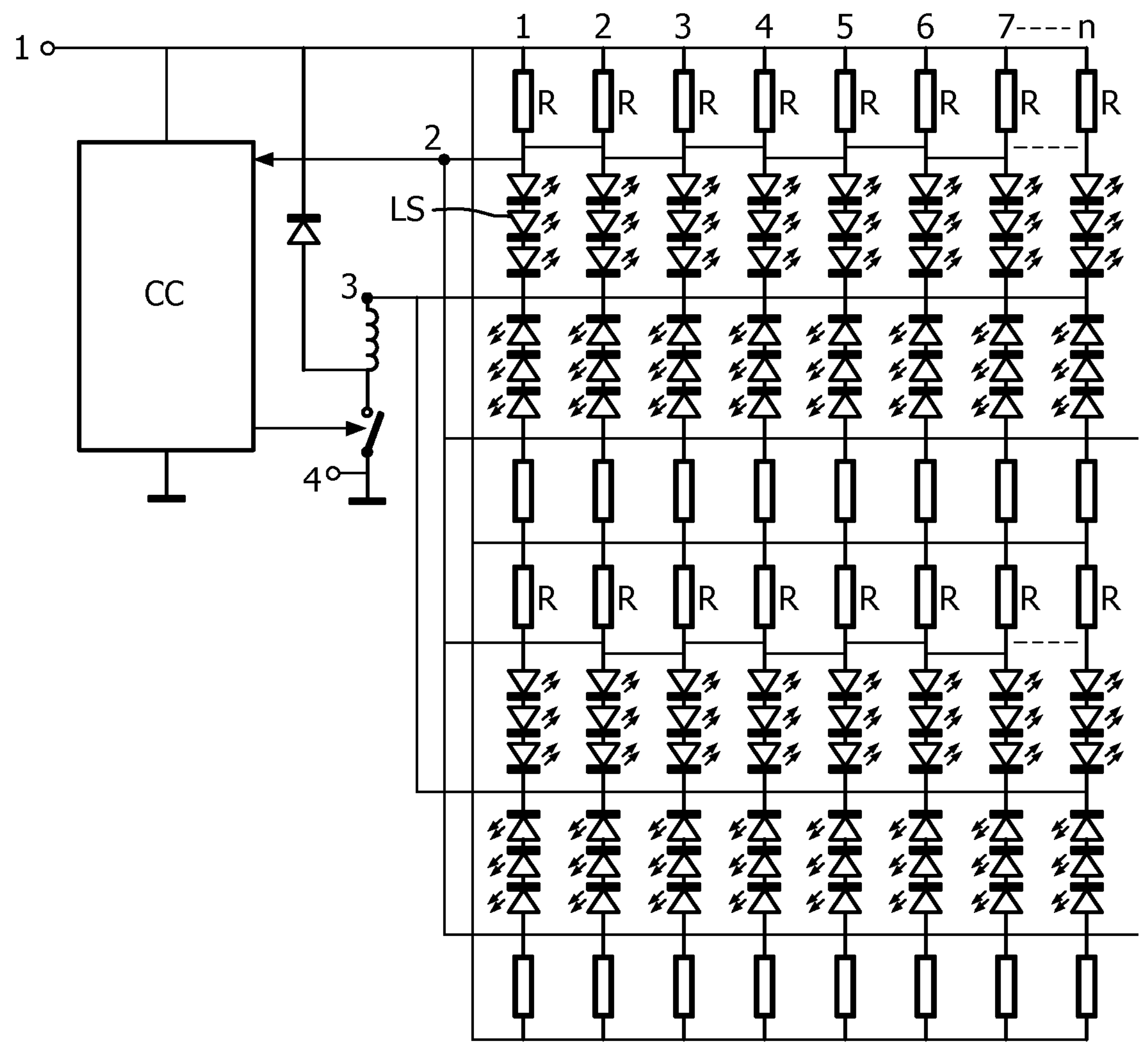

In FIG. 7 an embodiment of a LED light source according to the invention is shown, comprising four parallel LED strips and a single switch mode power supply. In this embodiment the first LED strip and the second LED strip are so oriented towards each other that the cathodes of the LED strings in the first LED strip are facing the cathodes of the LED strings in the second LED strip.

Similarly, the third LED strip and the fourth LED strip are so oriented towards each other that the cathodes of the LED strings in the third LED strip are facing the cathodes of the LED strings in the fourth LED strip. As a consequence, the ends opposite to the LED strings of the resistors R, comprised in the second and the third LED strip, are facing the corresponding ends of the resistors R in the third LED strip. By connecting the facing cathodes of the LED strings to each other and also connecting the facing ends of the resistors R to each other less wiring is needed to further connect the cathodes of all the LED strings to terminal 3 and the facing ends of the resistors R to terminal 1. The operation of the LED light source shown in FIG. 7 is identical to the operation of the embodiment shown in FIG. 3.

The invention has been described in the preceding with reference to the accompanying drawings. It may be however possible to operate the invention in an embodiment, in which

- the resistor of at least one of said series arrangements is controllable and is connected to an associated lamp control device,
- the resistors of each series arrangement is controllable and connected to an associated lamp control device,
- the LED light source is a track light source comprising an electrical supply track and/or
- the series arrangement of LED string and resistor is comprised in a lighting device, said lighting device being removably connected with said electrical supply track, e.g. using a corresponding detachable connector.

The invention claimed is:

1. An LED light source comprising a first LED strip including input terminals for connection to a DC-supply source, a load comprising a plurality of parallel series arrangements, each series arrangement comprising an LED string and a resistor in series and having a common terminal between the LED string and the resistor, a plurality of conductive paths connecting the series arrangements between the input terminals; and a sensing conductive path connecting the common terminals of each of the series arrangements of the plurality of series arrangements.

2. The LED light source as claimed in claim 1, further comprising a switch mode power supply for generating a current out of a DC supply voltage, said switch mode power supply comprising output terminals coupled to the input terminals of the first LED strip, input terminals coupled to the DC supply voltage a circuit provided between the input terminals and the output terminals, including a switch and an inductive element in series arrangement, and an unidirectional element restricting the current flow between the output terminals to one direction only, and a control circuit equipped with an output terminal coupled to the switch for controlling the conductive state of the switch and with an input terminal coupled by the sensing conductive path to the common terminals of the resistors and the LED strings for sensing the current in each of the LED strings.

3. The LED light source as claimed in claim 2, wherein the switch mode power supply is a down converter.

4. The LED light source as claimed in claim 1, wherein the first LED strip comprises a series arrangement of a sensor and a resistor coupled in parallel with all the series arrangements of a resistor and a LED string comprised in the load and wherein a common terminal of the sensor and the resistor is connected to all the common terminals of the resistors and the LED strings comprised in the load.

5. The LED light source as claimed in claim 4, wherein the sensor is a presence sensor.

6. The LED light source as claimed in claim 4, wherein the sensor is a light sensor.

7. The LED light source as claimed in claim 2, wherein the LED light source comprises a second LED strip including input terminals connected to the input terminals of the first LED strip, a further load comprising a plurality of parallel series arrangements connected between the input terminals, wherein each series arrangement comprises a LED string and a resistor in series and the common terminals of the resistors and the LED strings are all connected to each other and to the input terminal of the control circuit.

8. The LED light source according to claim 1, wherein the resistor of at least one of said series arrangements is a controllable resistor, connected to at least one associated lamp control device to control the resistance of said resistor.

9. The light source according to claim 8, wherein the resistor of each series arrangement is controllable and is connected to said at least one lamp control device.

10. The LED light source according to claim 9, wherein the LED light source is a track light source comprising an electrical supply track.

11. The LED light source according to claim 10, wherein the series arrangement of LED string and resistor is comprised in a lighting device, said lighting device being removable connectable with said electrical supply track.

* * * * *